73-152
3/2/76          SR
         OR    3,940,980

United States Patent [19]
Tasker et al.

[11] 3,940,980
[45] Mar. 2, 1976

[54] OIL WELL PRESSURE SENSING SYSTEM

[75] Inventors: Homer G. Tasker, Sherman Oaks; William F. Green, Woodland Hills, both of Calif.

[73] Assignee: Whittaker Corporation, Los Angeles, Calif.

[22] Filed: Apr. 8, 1974

[21] Appl. No.: 458,844

[52] U.S. Cl................................... 73/152; 73/395
[51] Int. Cl.$^2$............................................ G01L 7/06
[58] Field of Search ............. 73/152, 313, 319, 395; 323/51, 75 E; 307/118

[56] References Cited
UNITED STATES PATENTS
2,580,999   1/1952   Conrad ................................ 73/395
2,640,971   6/1953   MacGeorge ........................ 323/51

Primary Examiner—James J. Gill
Assistant Examiner—Anthony V. Ciarlante

[57] ABSTRACT

An oil well fluid depth or pressure sensing system for sensing pressures adjacent the bottom of the oil well and providing signals on the surface indicative of the pressure range in the well. The sensor comprises a pressure sensitive switch utilizing a nestable welded bellows. Information is transmitted to the surface through a single wire, with grounded shield return. A phase sensitive detector circuit is located at the surface for providing signals indicative of normal pressures, over pressures and under pressures, as well as any malfunction in the system.

13 Claims, 28 Drawing Figures

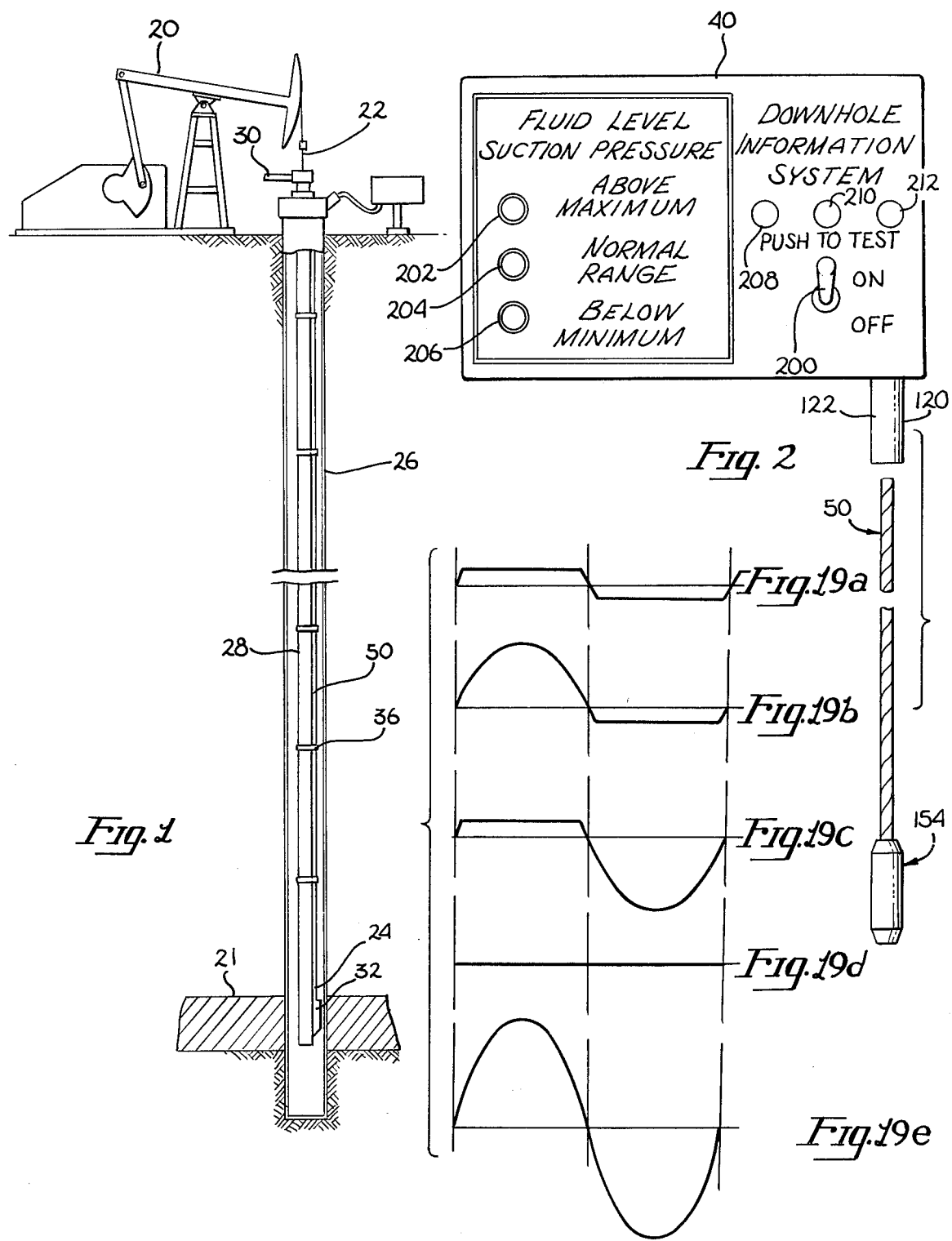

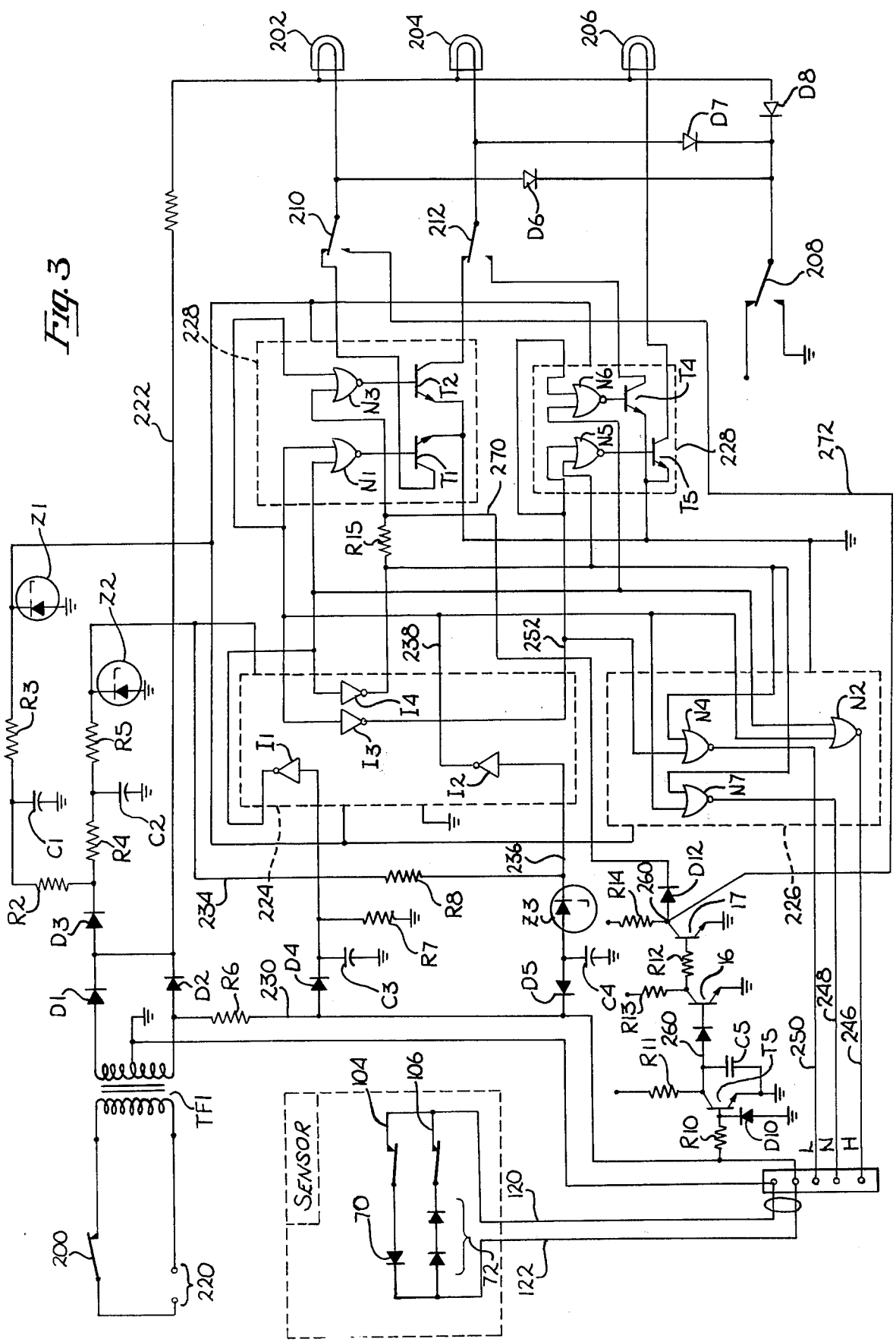

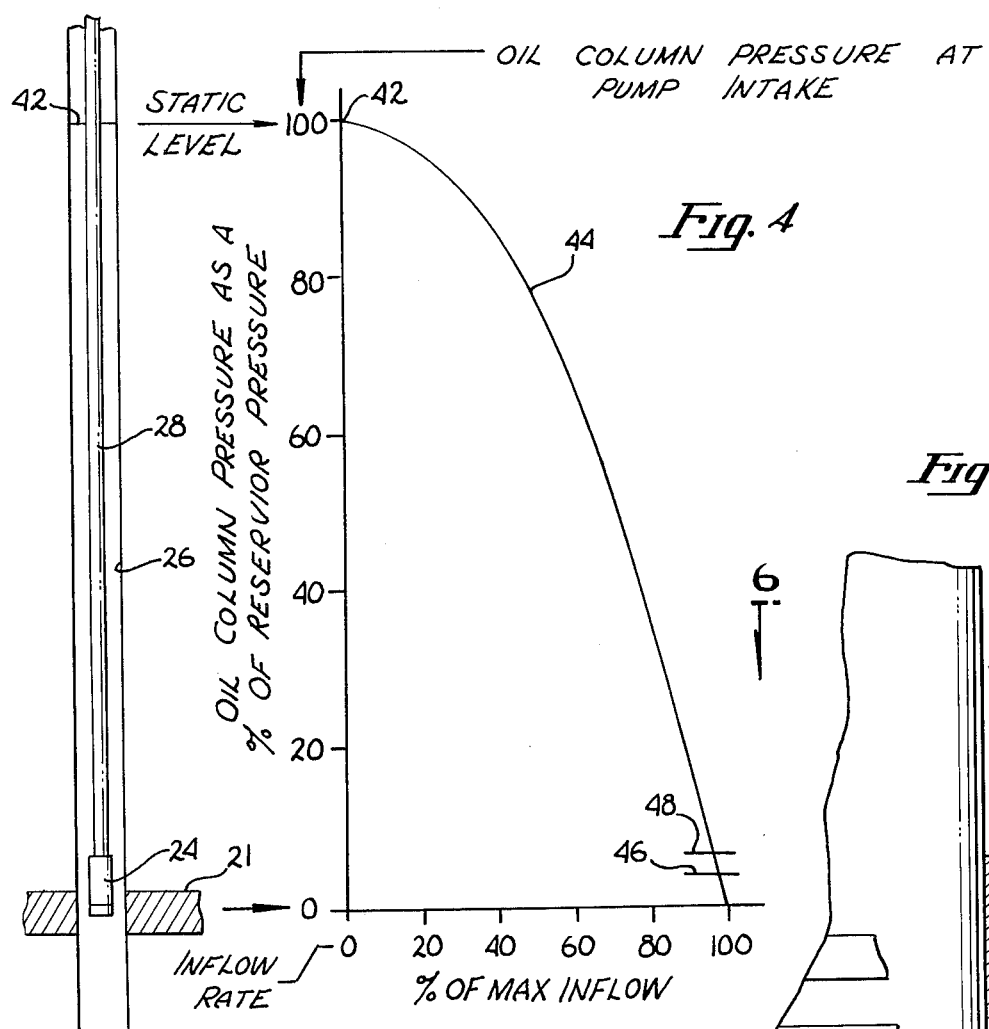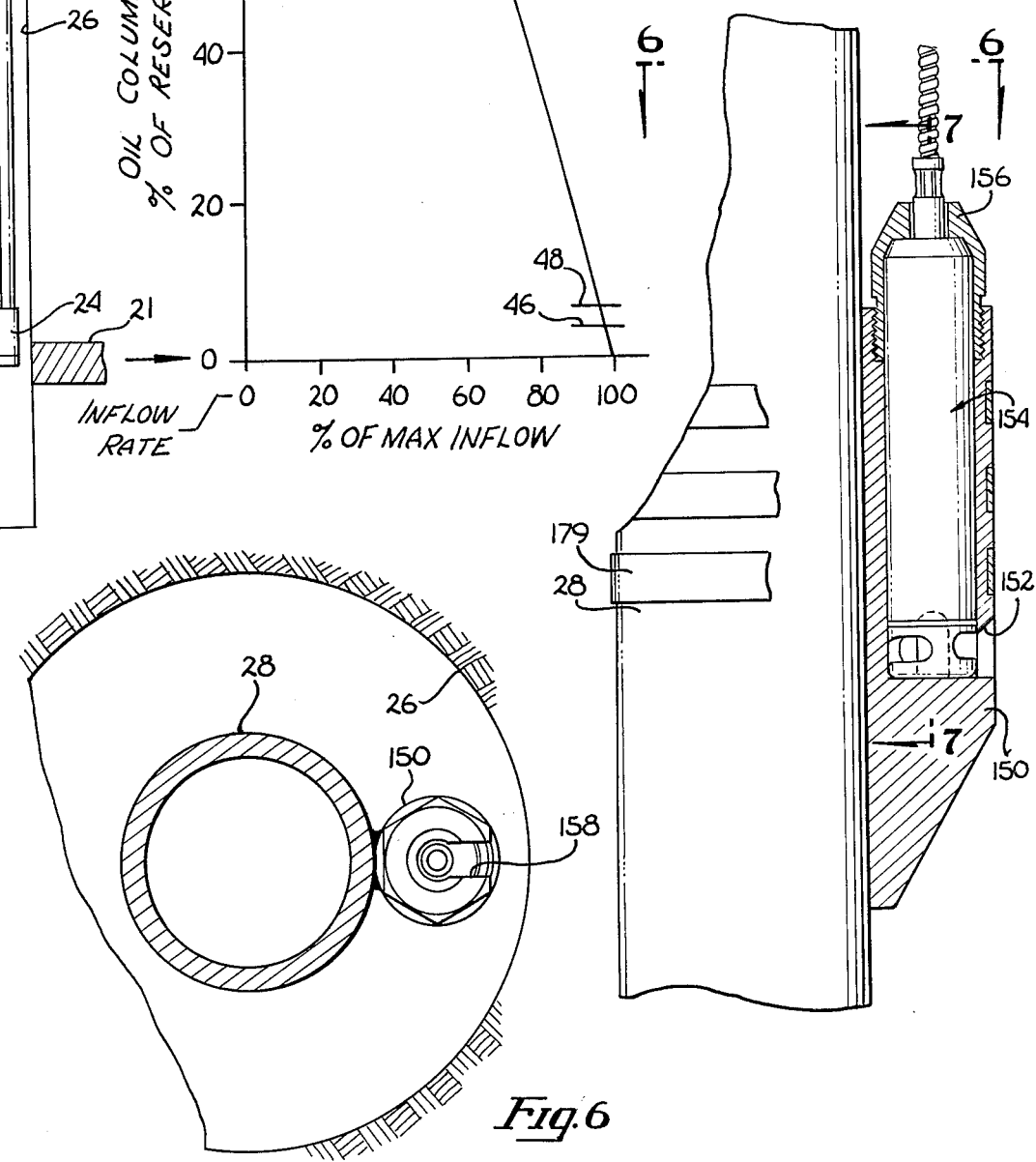

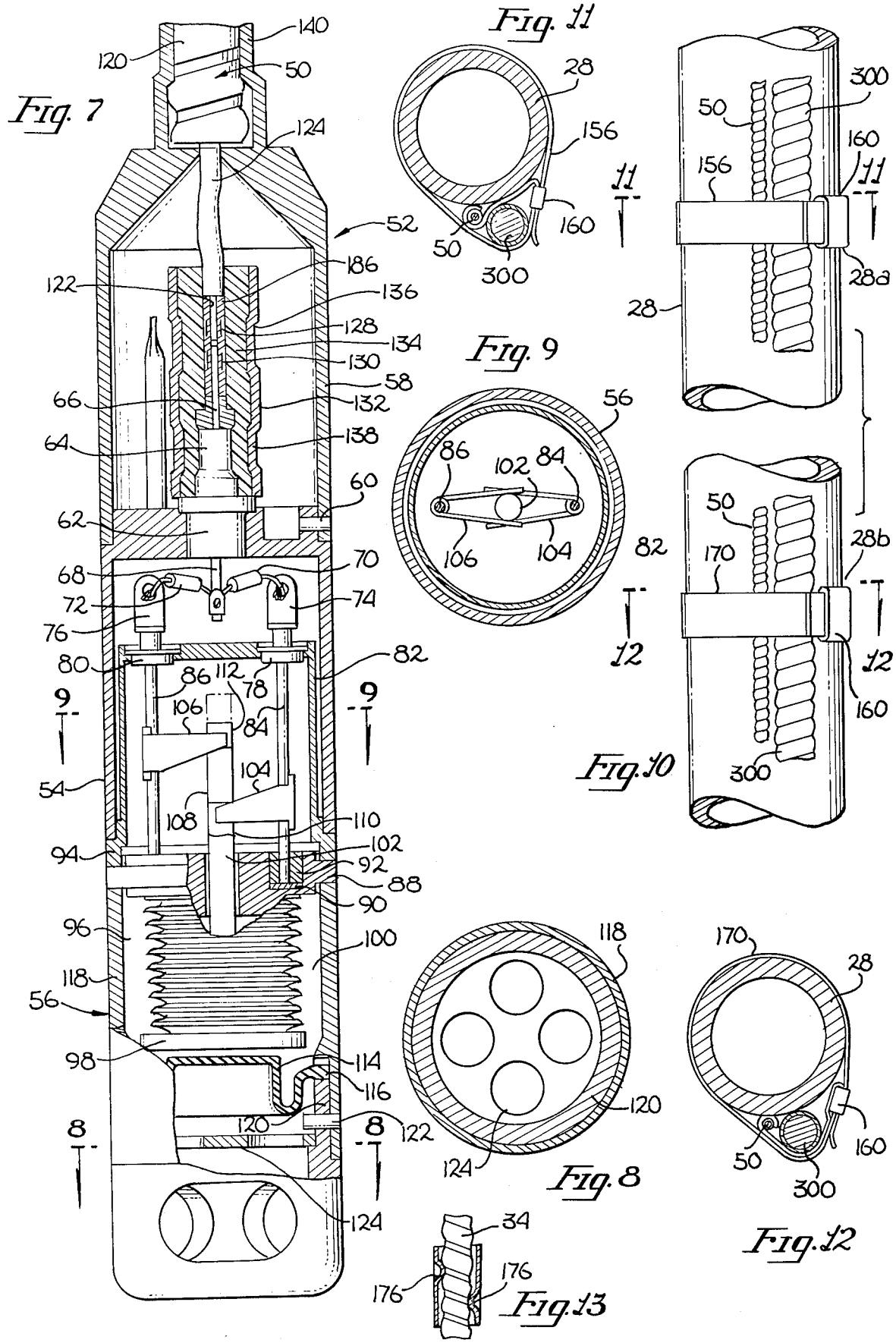

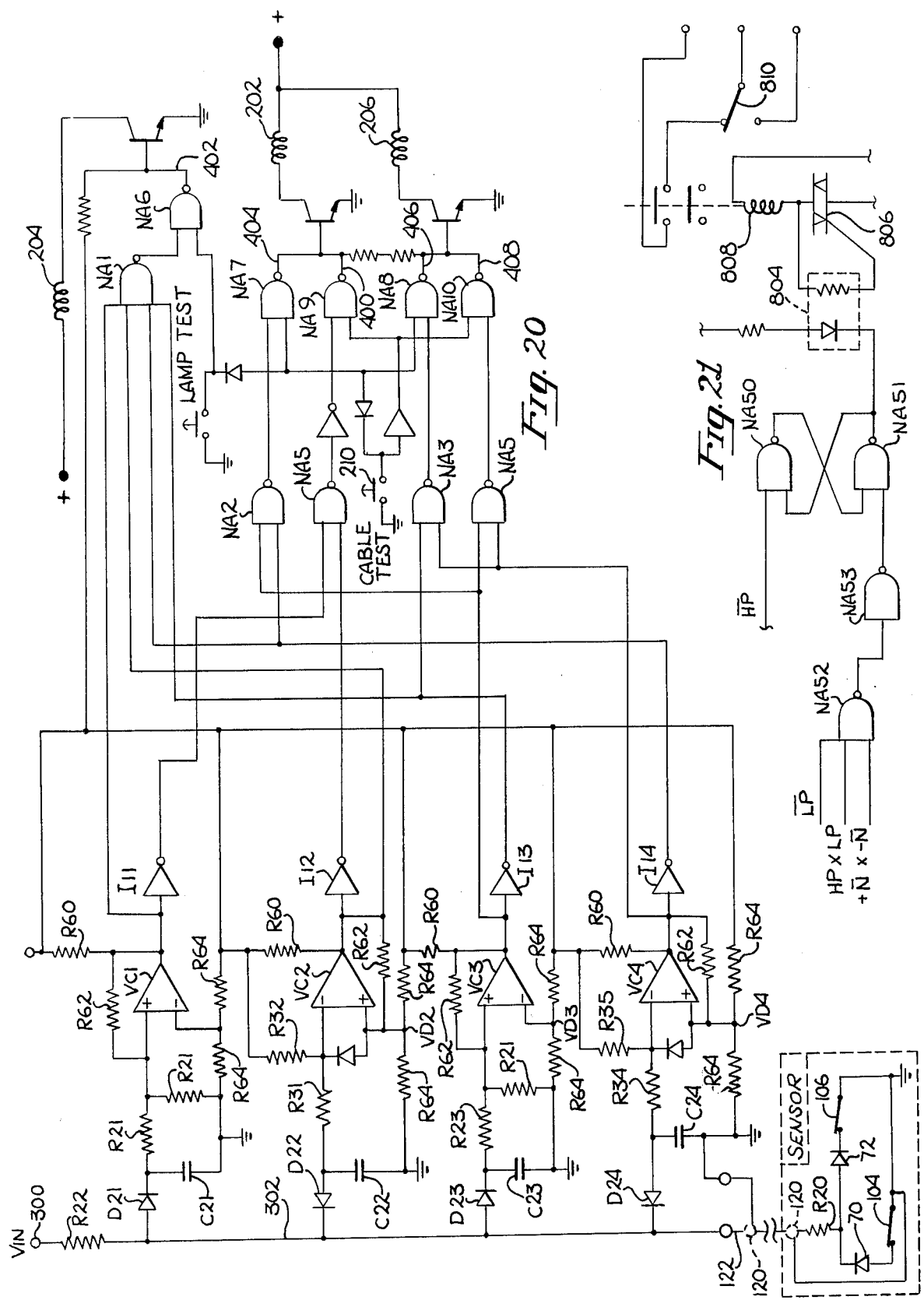

OIL WELL PRESSURE SENSING SYSTEM

BACKGROUND OF THE INVENTION

1. Field of the Invention

The present invention relates to the field of oil production via artificial lift methods, and more particularly, to systems for sensing the pressure adjacent the intake of the artificial lift mechanism.

2. Prior Art

A typical artificial lift oil well will have a pump located at a suitable depth in the well, often adjacent the bottom thereof, to deliver oil through pipe within the well casing to the surface. These pumps are designed to operate beneath the oil level in the well and will be subject to rapid deterioration and premature failure if allowed to operate with too low a fluid level or pressure at the pump intake. Accordingly, for a given pump there is a minimum oil level above the intake which will minimize wear or damage and prolong operation thereof; one important class of these pumps, known as submersibles being subject to cavitation and quick burn out of its submerged driving motor if the fluid level falls below such minimum.

In typical oil wells production is achieved by the seepage of oil from an oil-bearing geological formation or reservoir to the unbalance between the pressure existing in the reservoir and that due to fluid level in the well itself. Accordingly, the well production decreases with increasing oil level in the well. Thus, the oil level should be maintained within predetermined limits, a higher level unnecessarily reducing the well production and a lower level increasing the frequency of pump failure and thereby increasing costs because of the time and expense incurred in repairing a pump. These costs and down time are substantial, since the pump must be brought to the surface for repairs or replacement and relowered before the well may be started up again.

For a properly designed pump, rapid deterioration and failure may be prevented with a relatively low intake pressure, which by way of example, may represent less than 5 percent of the static level (e.g. the non-pumping equilibrium level) of the well. Also, typically production rates begin diminishing immediately with an increase in oil level in the well so that it is desirable to maintain the oil level within a few per cent of the minimum allowed level. On the other hand, there will be a few times when the pump will not be producing, such as during pump failure, removal and replacement, etc. At this time, the oil level in the well will reach or at least approach its maximum or static level which typically may be on the order of 20 times the normal level. Accordingly, any sensing system for sensing oil levels within the normal (desired) range must be capable of very substantial over pressures without altering the performance thereof.

BRIEF SUMMARY OF THE INVENTION

An oil well pressure sensing system for sensing pressures adjacent the bottom of the oil well and providing signals on the surface indicative of the pressure range in the well. The sensor comprises an evacuated pressure sensitive switch ulitizing a nestable bellows as the pressure responsive element to provide first and second switching signals. The nestable bellows provides a high over pressure capability, with the bellows being isolated from contaminants in the well by an intermediate fluid retained by a diaphragm member. The two switching elements are each in series with a diode device, the two diode devices being connected with reverse polarities, and the two series combinations of switches and diode devices being grounded at their switch ends to the sensor case and being connected at their diode ends to the sensor output terminal. The latter connection may be direct or via a series resistor. The diode devices may each consist of a single diode element or of two diode elements connected in series-aiding polarity. Information is transmitted to the surface through a single wire with a phrase sensitive detector circuit located at the surface for providing signals indicative of normal pressures, over pressures and under pressures as well as malfunctions in the system, such as shorts and opens.

BRIEF DESCRIPTION OF THE DRAWINGS

FIG. 1 is a view of a typical oil well installation.

FIG. 2 is a view of the electronics package 40 as it connects through cable 50 to the sensor 154.

FIG. 3 is a circuit diagram for one embodiment of the electronics package of the present invention.

FIG. 4 is a curve illustrating the variation in production with oil well pressure.

FIG. 5 is a partial cross-section illustrating the attachment of the sensor 154 to the pipe 28.

FIG. 6 is a cross-section taken along lines 6—6 of FIG. 5.

FIG. 7 is a cross-section of the sensor taken along lines 7—7 of FIG. 5.

FIG. 8 is a cross-section taken along lines 8—8 of FIG. 7.

FIG. 9 is a cross-section taken along lines 9—9 of FIG. 7.

FIG. 10 is a view illustrating the pipe coupling and the manner of protecting the cable at the coupling.

FIG. 11 is a cross-section taken along lines 11—11 of FIG. 10.

FIG. 12 is a cross-section taken along lines 12—12 of FIG. 10.

FIG. 13 is a cross-section taken along lines 13—13 of FIG. 12.

FIGS. 19a through 19e are typical wave forms illustrating the wave forms achieved for normal pressures, high pressures, low pressures, shorts and opens.

FIG. 20 is a circuit diagram for an alternate form of electronics package for use with the present invention.

FIG. 21 is a circuit diagram for an automatic pump control circuit for use with the present invention.

DETAILED DESCRIPTION OF THE INVENTION

Figure 14:
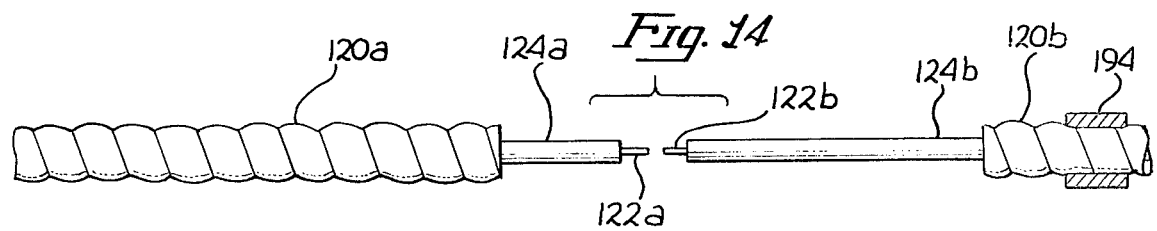
FIGS. 14 through 18 are figures illustrating the component parts and the use thereof in splicing the cable.
Figure 15:
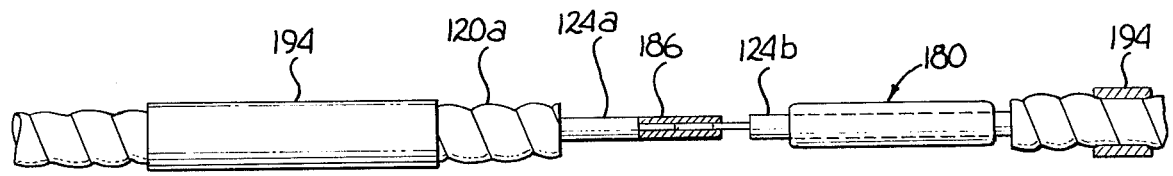

First referring to FIG. 1, a side view of a typical working oil well incorporating the present invention may be seen. At the surface is a pump drive mechanism, generally indicated by the numeral 20, driving by pump rods 22 a pump 24 located adjacent the oil bearing formation 21 near the lower end of the well casing 26 and connected to delivery pipe 28 for delivering oil at the top of the well through connection 30. The present invention sensor 32 is located adjacent the lower end of the pump 24 and is coupled to cable 50 attached to pipe 28 at a plurality of points by clamps 36. The output of sensor 32 is provided through cable 50 to an electronics package 40, which as shall subsequently be seen may be utilized to provide visual indications of the oil level in the well and/or control signals for the automatic control of the pump drive 20 to maintain the oil level within the desired limits.

Now referring to FIG. 4, a graphical illustration of the requirements for a suitable pressure sensing system in accordance with the present invention may be seen. In the left hand portion of this illustration, a section of the oil well is shown schematically, that section including casing 26 and pipe 28 with the pump 24 located adjacent an oil-bearing formation 21 near the bottom of the well. If the pump is not operating, the reservoir pressure existing in the oil bearing formation 21 will cause oil to seep into the well and rise within casing 26. The pressure produced by the weight of the rising oil column in casing 26 will increasingly oppose the reservoir pressure and retard the oil inflow until static level 42 is reached. At this point the two opposing pressures are just balanced so that the net seepage of oil into the well is zero. Accordingly, the well is not producing under this condition. For purposes of the curve to the right of FIG. 4 this indicates an oil column pressure equal to 100 percent of reservoir pressure would be a substantial percentage of well depth.

When, by pumping, the oil level in the well is reduced below the static level, and there is a new flow of oil into the well generally indicated by the curve 44. Because of the shape of curve 44, it is quite advantageous to maximize the inflow by minimizing the oil column pressure in the wel. It will be noted that the inflow reaches maximum when the oil level at the pump intake is zero. Although this represents the point of maximum oil production from the well it subjects the pump, of whatever type, to rapid deterioration and premature failure. In particular, rod driven pumps are subject to pounding which results in pump damage or rod breakage or both unless the minimum oil column pressure at the pump intake is maintained at a value which depends on pump size, well depth, etc. When pumping from loose sand formations rapid wear occurs in the pump itself. For electrically driven centrifugal pumps much higher intake pressures are required because these pumps, capable of very high production rates, will otherwise cavitate and quickly burn out.

Such a minimum level is generally indicated by the numeral 46. While some increase in pressure above this level can be tolerated, any increase represents some decrease in production rates, and therefore it is economically advisable to operate the pump so that the oil level is generally between the minimum level 46 and some predetermined slightly higher maximum level such as level 48. Accordingly, a minimum and a maximum level such as levels 46 and 48 may be predetermined to provide an acceptable compromise between pumping rate and pump life for the best overall economic operation of the well. These then would represent upper and lower pressure limits for the present invention, which though they may be variable for different wells, they are more apt to be constant for a particular type of pump, and typically represent a low percentage of the maximum pressure to which the sensor may from time to time be exposed such as during pump failure, removal and replacement. Accordingly, it is required that the pressure sensor in any system be capable of withstanding an over pressure on the order of 20 times the desired sensing range without causing a deviation in sensitivity or offset of the sensor output.

In the preferred embodiment of the present invention system, a sensor of FIG. 7 is utilized to achieve the desired result. This sensor is an extremely simple and rugged device providing the desired signal output to a single wire cable, generally indicated by the numeral 50. The sensor is comprised of three major sections, that is, an upper section, generally indicated by the numeral 54 within which the switching devices and other mechanism is located, and a lower section 56 enclosing the sensing bellows and providing fluid isolation between the sensing bellows and the oil.

The central section 54 has an outer case member 56 to which the case member 58 of the upper section 52 is attached by pin 60. A hermetic feedthrough 62 is mounted on the top of member 56 having an upward protruding terminal comprised of metal section 64 and a top pin 66, generally physically duplicating the conductor wire of cable 50. Other elements for connecting the sensor assembly to the cable 50 will be described later as they are similar to design and function as the equivalent parts for splicing the cable at various points along its line.

Integral with member 66 and projecting downward into the central chamber is a terminal 68 electrically coupled through diode devices 70 and 72 to terminals 74 and 76 respectively. These terminals are the upper terminals of feedthrough type devices 78 and 80, respectively, supported on an inner support member 82 with downward projecting rods 84 and 86 being electrically integral with terminals 74 and 76. These rods are supported at the base thereof on a metal member 88, but are electrically isolated therefrom by a lower insulating pad 90 and a cylindrical insulator 92. A nestable bellows 96 is welded to the lower portion of member 88 and in turn has a lower end cap 98, which together with the bellows member 94 of member 82, member 56 and terminal 62 provide hermetic enclosure for the central section 54. This enclosure in the preferred embodiment is evacuated via tube 29 and sealed so that changes in temperature will not result in a change in pressure of the gas therein to affect the balance of forces on nestable bellows assembly 96.

The bellows assembly 96, referred to herein as a nestable bellows is of a type known in the bellows art as a welded diaphragm bellows and is of a class thereof which employs diaphragm contours of a type known as nesting ripple. Welded diaphragm bellows comprise pairs of washer-like diaphragms, each pair being joined by welding at the inside diameter to form a convolution. A series of convolutions is then stacked and welded at the outside diameters to form a capsule. In the preferred form of the capsule for the present invention a slight separation is established, during heat treatment, between outside diameters (and inside diameters) of adjacent convolutions. Accordingly, such bellows exhibit an elastic range which results in an increase and decrease of this separation with a generally linear elastic characteristic. However, when compression forces exceed a certain predetermined limit the convolutions nest, that is, the gaps or separation between adjacent washer-like members opposite the welds are reduced substantially to zero so that further loads result only in face to face pressures of the washer like members. Accordingly, the bellows are no longer free to further compress, and exceptionally high stress loads may be withstood without substantially increasing strain on the bellows, and particularly strain on the normal elastic portion so as to result in any permanent offset or destruction of the bellows. Thus, such nestable bellows may take relatively high compressive loans (pressures) way beyond the elastic region of the bellows without exceeding the elastic limit thereof. It may be seen that a high fluid pressure in the chamber 100 around bellows 96 will "bottom out" the nested bellows, ending the travel thereof without causing a permanent offset.

Electrically and mechanically attached to lower cap member 98 is a central post 102 slidably extending upward through a mating opening in member 88 and projecting past wipers 104 and 106 attached to post 84 and 86 respectively. Post 102 has a central insulated portion 108, and is further provided with upper and lower uninsulated sections 110 and 112 respectively. Accordingly, with central post member 102 in the position shown, both wiper members 104 and 106 slidably engage the uninsulated portions 110 and 112, respectively, of the central post, thereby connecting terminals 74 and 76 to ground through the wipers, central post, and bellows 96 to the sensor case.

If the pressure in region 100 is reduced, bellows 96 will be further extended, withdrawing central post 102 to a lower position, allowing wiper 104 to engage the insulated portion 108 so as to open the circuit therebetween. Similarly, when pressure in region 100 is increased, bellows 96 will compress, causing central post 102 to move upward, and wiper member 106 will engage the insulated portion 108 of the central post to open the circuit therebetween. Accordingly, in the condition illustrated in FIG. 7 representing the normal pressure condition, terminals 74 and 76 are shorted to ground, whereas in low pressure condition only terminal 76 will be shorted to ground, and in high pressure condition only terminal 74 will be shorted to ground.

Rather than expose the nestable bellows 96 directly to the oil in the oil well which may contain particles large enough to interfere with nesting of the bellows, it is preferable to fill cavity 100 with a fluid having a low freeze point and a high boiling point to isolate that region from the oil in the well by means of a yieldable diaphragm member 114. This diaphragm member has an outer annular section similar to an O-ring, which is engaged between the lower portions of members 118 and the upper portion of member 120. Member 118, together with member 88, bellows 96, cap member 98 and the diaphragm member 114 provide a hermetically sealed enclosure for region 100 to retain the fluid therein. Member 120, fastened to member 118 by pins 122, is provided with a screen-like member 124 (also visible in FIG. 8) to prevent the contact of relatively large foreign objects with the lower surface of diaphragm member 114.

The provision of splicing the cable in the present invention is illustrated in FIGS. 14 through 18. On one cable the shield 120a and insulator 124a are cut back to predetermined locations with respect to the conductor wire 122a. A similar provision is made for conductor 122b with respect to the insulator 124b and shield 120b, the shield 120b being slidable with respect to the insulator 124b and being slid to a position further removed from the end of the conductor than for the other section of wire. The next step in the splicing is to place an assembly, generally indicated by the numeral 180, over the insulator 124b. Assembly 180 is shown in cross section in FIG. 17 and is comprised of an outer metal cylindrical member 182 having its ends slightly rolled over to confine a tubular plastic insulating member 184 therein. Member 184 is slidable upon tubular member 124b, so that it may be readily disposed in the position shown in FIG. 15. The next step is to place a small tubular conductor member 186 over ends 122a and 122b of the conductors and to slide the conductors approximately into abutment at the center of member 186. (Only partial assembly being shown in FIG. 15.) Member 186 is then crimped in locations 188 and 190 by a predetermined amount so as to provide firm mechanical and electrical connections between member 186 and conductors 122a and 122b respectively. In the preferred embodiment a six sided crimp is used, which approaches a perfect shrinkage of member 186 at the desired location rather than a mere flattening thereof.

Figure 16:
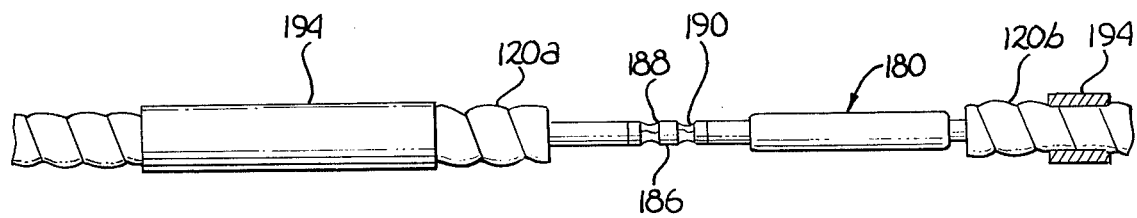
Figure 17:
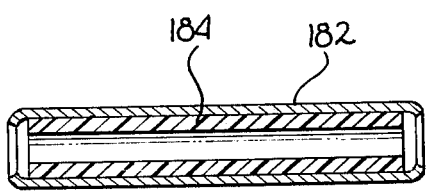
Figure 18:
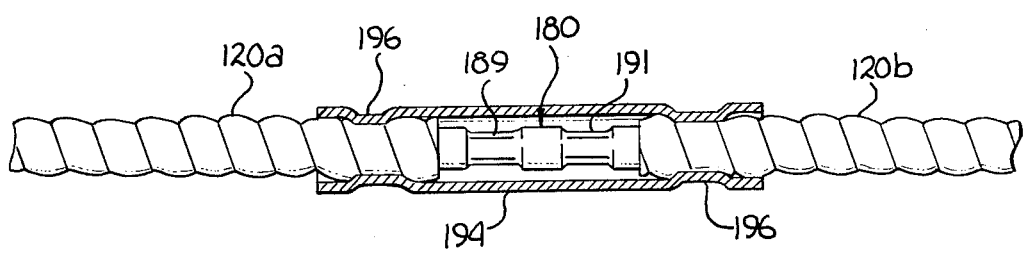

After the crimping described with respect to FIG. 16, the assembly 180 is slid to the left (reference FIG. 16) so that the left end thereof generally engages the end of the shield 120a. Thereafter shield 120b is slid to the left with respect to insulator 124b to about the right hand end of assembly 180. At this stage, member 180 is crimped at locations 189 and 191, utilizing the preferred six sided crimp, to provide firm mechanical engagement between the plastic insulator 184 and insulators 124a and 124b. Finally, member 194, previously placed over either shield and slid out of the way, is disposed generally symmetrically with respect to member 182 and crimped in locations 196 to mechanically couple the two shields 120a and 120b together. Accordingly, mechanical integrity of the connections is assured by the mechanical grip and the mechanical integrity of member 194 to the adjacent cable shield. Electrical integrity is provided by the firm crimping of member 186 by the two adjacent ends of the conductor wire. Finally, the connections provide the desired hermetic seal by the firm crimping of member 182 to provide firm continuous engagement by member 184 to insulators 124a and 124b at each side of the electrical connection provided by member 126.

Having now described the details of splicing the cable, the matter of securing the cable 50 to the sensor will now be described with reference to FIG. 7. Member 58 and cable shield 120 are initially slid to an upper position so as to expose members 64 and 66 so that the wire 122, having teflon insulator 124, may be attached thereto. The insulator 124 is removed from a predetermined length of conductor 122. A small tubular member 186 is placed over pin 66 and receives conductor 122 through the other end thereof. As in the case of cable splicing, member 186 is then crimped in regions 128 and 130 to crimp against conductor 122 and pin 66 respectively. Member 132 (analogous to member 186 of FIG. 15) with an inner insulating member 134 concentric therewith and initially disposed in an upper position concentric to insulator 124, is then slid downward over member 126 and itself is crimped in regions 136 and 138 to mechanically clamp and couple insulator 124 to glass insulator section 64 and to insulator 124. Thus, it may be seen that insulator 124 is mechanically secured and wire 122 is both mechanically and electrically secured to the assembly. Thereafter member 58 is slid into the position shown and fastened thereat by pins 60 and shield 120 is slid downward into the position shown. Finally, the upper portion 140 of member 58 is crimped to mechanically lock the shield in that position, thereby completing the assembly. Hermetic sealing of the wire connection is achieved, not by member 58, but instead by the sealing action of the plastic insulator 134 as clamped by member 132.

Now referring to FIG. 5, a preferred means of attachment of the sensor of the present invention to the pipe 28 may be seen. A mounting bracket 150 having openings 152 near the lower end thereof is securely welded or banded by bands 103 to pipe 28 or to the pump as may be required. The sensor itself, generally indicated by the numeral 154, is received within member 150 and secured by a retaining cap 156 threadedly engaging member 150. This assembly, located within the well casing 26, may be seen in FIG. 6. As shown, it is desirable to provide slot 158 in cap member 156 so that the cable may pass therethrough to allow easy installation or removal of the sensor.

Now referring to FIGS. 10 through 13, the methods of attaching the cable to the pipe 28 will be described. It is desirable that the cable 50 be supported by periodic attachment to pipe 28 particularly in the case of deep installations where the length of pipe 28 may be several thousands of feet. In addition to providing vertical support for the cable such attachment minimizes the possibility of entanglement of the cable while the pump is being lowered into place or while it is being pulled out for repairs.

Two cases are to be distinguished. Referring to the figures in the first of these cases there may be seen cable 50 of the present invention and additionally a much larger cable 300 which conducts power to an electric motor driven pump of the class known as submergible. The power cable 300 is attached periodically to pipe 28 as may be seen at 28a and 28b by strapping bands 156 and 170 respectively. Referring now to FIG. 11, the strapping band 156 is applied in the same manner as conventional steel bands commonly utilized for the banding or shipping crates and the like, wherein, after tensioning, the band is locked by crimping the sealing clip 160. In like manner band 156 maintains cable 300 in compressive contact with pipe 28 and provides restraint against both horizontal and vertical motion of the cable.

It is desirable that, as seen in FIGS. 10 and 11, cable 50 be located adjacent cable 300 in the space enclosed by band 156, thereby insuring the protection afforded by presence of the larger cable 300. The arrangement shown does not, however, provide vertical support for cable 50. Therefore at alternate or other suitable banding points of cable 300, such as at 28b and in FIG. 12, a dual-cable band 170 is provided, which not only secures power cable 300, but also grips cable 50 to provide vertical support thereof. These dual-cable bands, as seen in FIG. 13, have a reverse bend 302 adjacent sealing clip 160 followed by a U-shaped bend 304 proportioned to receive cable 50. When the band is placed as in FIG. 12 and tensioned, the U-shaped section tends to close firmly around cable 50. To assure that the cable will not slide vertically within U-shaped bend 304, the inner portion thereof has a pair of dimples 176 appropriately disposed to engage the outer contour of cable 50 to provide mechanical retention against vertical motion of the cable.

In the second case to be distinguished, there is no power cable present. This condition is typical of mechanical pumps driven from the surface by reciprocating a series of connected rods within pipe 28 and employing a rocker arm mechanism such as illustrated in FIG. 1. In this case cable 50 is secured periodically to pipe 28 by means of conventional bands 156 as described in connection with FIG. 11. The compressive force between cable 50 and pipe 28 resulting from the tensioning and locking of band 156 provides restraint against both horizontal and vertical motion of the cable.

Now referring to FIGS. 2 and 3, a schematic representation of the electronics package 40 together with sensor 154 and cable 50, and a circuit diagram for the electronics package respectively may be seen. The electronics package 40 in this embodiment utilizes an on-off switch 200 to couple input power to the circuit itself, a yellow signal light 202, a green signal light 204 and a red signal light 206, and three push to test buttons 208, 210, and 212. Green light 204 is for the purposes of indicating that the oil level is within the predetermined desired range, whereas yellow light 202 is for the purposes of indicating that the oil level has risen above the normal or predetermined desireable range, thereby reducing the well production rate but not otherwise jeopardizing the equipment. Red light 206 indicates that the oil level is below the predetermined minimum desirable, which is expected to result in cavitation and undesirable mechanical effects if the pump continues to operate in this condition. As will be subsequently seen, switch 208 provides a test for lights 202, 204, and 206, switch 210 provides a test for short circuits in the cable 50 and switch 212 provides a test for a break or open circuit in the cable. The two electrical connections between the electronics package 40 and cable 50 is a first connection to the conductor 122 of the cable and a second connection to the shield 120 of the cable.

Now referring specifically to FIG. 3, the operation of the circuit of this embodiment will now be described. Input power is applied at terminals 220, which in this embodiment is assumed to be 115 volt 60 cycle AC power. When switch 200 is turned on, transformer TF1 is excited. This transformer has a secondary winding with a grounded center tap, so that the combination of diodes D1 and D2 provide a full wave rectifier to provide a DC unfiltered power output on line 222. This DC signal is coupled through diode D3 to two voltage regulator circuits, one comprised of resistor R2, filter capacitor C1, resistor R3 and zener diode Z1, and the other comprised of resistor R4, filter capacitor C2, resistor R5 and zener diode Z2. These regulators, among other purposes, provide the required DC power to the integrated circuit devices indicated by the dashed line enclosures. Specifically, device 224 is a hex inverter (four of which are utilized) manufactured by RCA as their part number CD 4009AE, device 226 is a quad OR gate (three of which are used) manufactured by Signetics as their part number SN7402N and devices 228, also manufactured by Signetics as their part number SN75453P.

With power turned on and switches 104 and 106 being in the position shown in FIG. 3, the oil well is within the predetermined limits. Accordingly, wipers 104 and 106 of FIG. 7 contact uninsulated portions 110 and 112, respectively, and lines 120 and 122 are essentially connected together via diode devices 70 and 72. Accordingly, the AC voltage appearing across one half of the secondary of transformer TF1 appears across resistor R6, except for voltage drops across diode devices 70 and 72, so that the voltage on line 230 is essentially as shown in FIG. 19a. In this condition the conduction in diode D4 can, at most, charge capacitor C3 to the potential of one diode drop. Consequently, the input to inverter I1 is low and the output on line 232 is high. This output is applied as one input to NOR gates N1 and N2. At the same time current flows from one of the regulators through line 234 and resistor R8 through zener diode Z3 and diode D5 to line 230. Though diode D5 maintains capacitor C4 basically discharged, the voltage on line 230 includes the zener drop of zener diode Z3, which is chosen to approximately represent a high-low state voltage differential. Accordingly, the high state voltage is applied to inverter I2, with the low state output thereof on line 238 being applied as the second input to NOR gates N1 and N2, as well as being applied to the input of inverter I3 and one input of NOR gate N3. Thus, one input to NOR gate N1 is low and one is high at this condition, providing a low state output and maintaining transistor T1 off. However, since the state of line 232 is inverted by inverter I4 and applied as a second input to NOR gate N3, both inputs to NOR gate N3 will be in the low state, thereby providing a high state output for NOR gate N3,. turning transistor T2 on and coupling the return wire of bulb 204 to ground so as to turn that bulb on. This represents the normal state indicating lamp, indicating that the oil pressure is within the desired limit.

When the reservoir pressure (oil level) rises to the level indicated by the numeral 48 in FIG. 4, post 102 in FIG. 7 moves to the upper position so that the insulated portion 108 comes in contact with wiper 104 to open the circuit at that point, thereby leaving diode device 70 in the circuit but opening the circuit of diode device 72. Accordingly, when line 122 is positive with respect to line 120, diode device 70 is back biased so that the voltage between line 122 and shield 120 is determined by transformer TF1. On the negative half of the wave, however, diode device 70 is forward biased thereby clipping the negative half of the wave. Thus the wave form is shown in FIG. 19b. The negative half of the wave is the same as that of the normal pressure situation so that the signal on line 238 remains low. However, diode D4 and capacitor C3 provide a peak detector (with a time constant dependent upon resistor R7) so that the input to inverter I1 is high and the signal on line 232 is changed to the low state. Accordingly, both inputs to NOR gate n1 are now low and the output of the NOR gate N1 is high, thereby turning on transistor T1 and coupling the return line for the above maximum indicating light 202 to ground to turn on that light. At the same time the output of inverter I4, coupled as one input to the NOR gate N3, is in the high state, thereby providing a low state output for the NOR gate and turning off transistor T2 to turn off bulb 204.

It will be noted that in both of the foregoing examples the output on line 238 is low. Consequently, the output of inverter I3 on line 252 is high, giving a low state output for NOR gate N5 and maintaining transistor T3 off. If, however, the pressure level decreases below minimum, wiper 104 will make contact with the conductive portion 110 of post 102, whereas wiper 106 will contact the insulated portion 108. Accordingly, diode device 70 is effectively out of the circuit, whereas diode device 72 is operative. Diode device 72 clips the positive portion of the wave, giving a voltage wave form on line 122 as shown in FIG. 19c. The input to the converter I1 is low and the output on line 232 is high. However, the negative half of the cycle provides a low state output on line 236, and a high state on line 238. This provides a low state output for NOR gates N1 and N3. Since line 238 and line 232 are both in the high state the output of inverters I3 and I4 respectively are in the low state, thereby providing the high state output of NOR gate N5, turning on transistor T3 and illuminating bulb 206 by connecting its return line to ground. Accordingly, it can readily be seen that the above three described conditions result in the illumination of one and only one of bulbs 202, 204, and 206 at one time responsive to high, normal and low pressure levels. It may also be seen that the inputs to NOR gates N1, N3 and N5 are coupled to NOR gates N2, N7 and N4 respectively, so as to provide identical signals on lines 246, 248 and 250 respectively for connection for such purposes as remote indication and/or pump control.

Switch 208 is provided as a bulb test switch. It may be seen that depression of switch 208 ties the return for all three bulbs to ground through diodes D6, D7 and D8 to turn on all three bulbs.

Switch 210 provides a short circuit test as follows. The combination of resistors R10 and R11, capacitor C5, transistor T5 and diode D10 provide a rectifier to provide a DC voltage on line 260 responsive to the voltage on line 122. Thus, when the voltage on line 122 is positive, transistor T5 is turned on, capacitor C5 is discharged, transistor T6 is turned off through diode D11 and transistor T7 is turned on through resistors R12 and R13. Consequently, the voltage of point 260 is low and diode D12 is non-conductive, either by being back biased or by having essentially no bias thereon. Even if the pressure is in the normal range so that both diodes 70 and 72 in the sensor are operative, the positive half cycle will produce a voltage greater than the base threshold voltage of T5 since diode device 72 is actually two diodes in series thus producing a peak level of approximately 1–2 volts which is sufficient to provide the signals described. If, however, there is a short between line 122 and shield 120, the voltage applied to resistor R10 will be below the threshold voltage of transistor T5. Accordingly, transistor T5 will be clamped off, capacitor C5 will charge through resistor R11 turning on transistor T6, in turn turning off transistor T7 and applying a high state voltage through resistor R14 and diode D12 to line 270. This signal is isolated from the output of inverter I4 by resistor R15, and providing high state input to NOR gate N3, causes the output thereof to turn off transistor T2, thereby turning off lamp 204.

Accordingly, all lamps will be off, indicating either a short or a lamp failure, which may be tested for either by depression of switch 208 or by depression of switch 210, which will couple the low state voltage on the collector of transistor T6 to the return line of lamp 202 to light that lamp indicating the short. (The short wave form being generally as shown in FIG. 19d).

In the event of an open circuit, the wave form on line 122 would be as shown in FIG. 19e. In this case the signal on line 236 will be in the low state and the signal applied to the input of inverter I1 will be in the high state. Accordingly, at least one input of the NOR gates will be in the high state except for NOR gate N6, which will have both inputs in the low state. Thus, the output of NOR gate N6 will be in the high state, transistor T4 will be turned on, and by depression of switch 212 lamp 204 will light indicating the open condition. Thus, the lighting of the lamp 202 upon depression of switch 210 indicates a short condition, lighting of light 204 upon depression of switch 212 indicates an open condition, and failure of one or more of the lights to light upon depression of switch 208 indicates a lamp failure. (Switches 210 and 212 may be combined into a single double pole, double throw switch).

In summary, it may be seen that through the system of the present invention utilizing a single insulated conductor extending from the sensor at the bottom of the well to the electronics package at the top thereof, signals are derived indicating normal operation, high pressure operation, low pressure operation, failure due to a short circuit and failure due to an open circuit, as well as failure of the lamps themselves with the net result of extremely accurate, rugged and reliable pressure sensing as required for maximum economic production of the oil well.

Now referring to FIG. 20, an alternative embodiment for the sensor circuitry, and particularly the electronics package circuitry may be seen. In this embodiment of the sensor the two diode devices 70 and 72 are coupled respectively in series with switches 104 and 106 and the two series combinations are coupled in parallel as before. However, resistor R20 is now coupled between their diode ends and line 122. The circuitry is driven by an AC input voltage applied at terminal 300 with an initial dropping resistor R22 in series therewith. Thus, when both switches are closed as shown in the figure, the voltage on line 122 (neglecting diode voltage drops) is equal to VINR20/(R20 and R22). On the other hand, for any half cycle for which one of the diodes 70 and 72 is back biased and the switch for the other diode is open, the voltage on line 122 will be equal to VIN. Similarly, in the event there is an open in line 122, line 302 within the electronics package (which is in effect a continuation of line 122 running down into the well) will have voltage equal to VIN for both half cycles of the wave. Finally, if there is a short in line 122, the voltage on line 302 will be substantially zero, with the full input voltage appearing across resistor R22. Thus, polarity sensitive level detectors may be used to detect voltages on line 302 during the positive half cycle and the negative half cycle to detect normal pressure, high pressure, low pressure, shorts and opens as hereafter described.

Four voltage comparators VC1 through VC4 each have one input terminal coupled to a voltage divider VD1 through VD4, respectively. These voltage dividers are driven by a DC voltage, such as by way of example 5 volts DC, and are utilized to apply a predetermined reference voltage to an appropriate input terminal (positive and negative input terminals as indicated) of the respective comparator. The opposite terminal of each comparator is connected to line 302 through a rectifying circuit, which in this embodiment acts as a peak detector so as to provide a signal responsive to the peak negative or the peak positive voltage appearing on line 302. In particular, voltage comparators VC1 and VC3 are utilized to sense the peak positive voltage through diodes D21 and D23 respectively, with capacitors C21 and C23 providing the required storage (filtering) between cycles, and with resistors R21 and R23 acting as coupling resistors (conventional integrated circuit operational amplifiers or voltage comparators may be used with the manufacturer's suggested compensation networks, not shown, and occasionally utilizing a high value feedback resistor to provide high gain operation so as to operate substantially as a trigger or threshhold detecting device). Voltage comparators VC2 and VC4 are utilized to detect the peak negative voltage through diodes D22 and D24, with capacitors C22 and C24 providing the required time constant for the peak detectors. The networks comprised of resistors R31, R32, R34 and R35 are coupled to a +5 volt DC power supply to provide a voltage to a positive value for comparison with the positive value applied to the opposite terminal of the comparator. (Resistors R60 are pullup resistors, resistors R62 provide controlled histerisis, resistors R64 provide voltage dividers for the fixed input terminal, and diodes D30 limit the differential input of the respective comparitors.) For convenience, the outputs of the comparators VC1 through VC4 have been identified as +n, −N, HP and LP respectively. There is also provided an inverter (I11 through I14) to invert the output of each of comparators VC1 through VC4 to provide the logical inverse signals $\overline{+N}$, $\overline{-N}$, $\overline{HP}$ and $\overline{LP}$.

In normal operation at normal pressure both switches within the sensor (104 and 106) are closed so that the voltage on line 302 as previously mentioned, is equal to VinR20/(R20 and R22). This provides a DC signal on the positive input terminal of comparator VC3 which is less than the bias of the negative input terminal so that the output, HP, of the comparator is in the low state. ($\overline{HP}$ high) Similarly, the peak negative signal sensed by comparator VC4 is not sufficient to bring the input to the negative terminal below the positive input on the positive terminal, so that the output, LP, of that comparator is also in the low state. ($\overline{LP}$ high)

When the pressure goes above the predetermined limit, switch 106 in the sensor opens. Accordingly, the positive half cycle of the voltage on line 302 increases the input to the positive terminal of comparator VC3 to cause the output HP to change to the high state. The output of comparator VC4 does not change. However, had the pressure gone below the predetermined normal pressure, switch 104 would have opened causing the input to the negative terminal of comparator VC4 to drop, and the output LP to change to the high state.

Voltage comparators VC1 and VC2 are for detecting shorts. As with the other comparators, by proper selection of the resistors determining the switching points, the output of these comparators (+N and −N) may be maintained in the high state provided the voltage on line 302 does not fall below VinR20/(R20 and R22). Accordingly, in normal operation the output of these comparators is in the high state. However, if a short occurs, the output of these comparators will change to the low state (the signals HP and LP for a short will be in the low state). Finally, if there is an open in line 122, the voltage on line 302 will equal Vin for both the positive and the negative half cycle causing the signals HP and LP to both be in the high state. Accordingly, the table of logic states and positive logic equations to provide the desired information is presented below:

TABLE 1

|  | +N | −N | HP | LP | Equation |
|---|---|---|---|---|---|
| normal | 1 | 1 | 0 | 0 | +N × −N × $\overline{HP}$ × $\overline{LP}$ |
| high | 1 | 1 | 1 | 0 | HP × $\overline{LP}$ |
| low | 1 | 1 | 0 | 1 | $\overline{HP}$ × LP |
| short | 0 | 0 | 0 | 0 | $\overline{+N}$ × $\overline{-N}$ |
| open | 1 | 1 | 1 | 1 | HP × LP |

NAND gates NA1 through NA5 together with NAND gates NA6 through NA10 provide the logic functions of AND gates. It may be seen that the input to the NAND gates NA1 through NA5 is in accordance with the logic table presented herein. By way of example, for a normal pressure situation, both HP and LP are low, and without a short +N and −N are high. Accordingly, HP and LP in the low state provides the normal pressure signal with +N and −N in the low state providing an enabling signal, so that if a short occurs the normal pressure lamp will go out. The over pressure condition is indicated by $\overline{LP}$ and HP, whereas the low pressure situation is indicated by $\overline{HP}$ and LP. It is to be noted that neither of these conditions are achieved with either a short or an open conditions so that no additional enabling signal is required, and when a short or open appears, all three lamps will be off. On the other hand, a short condition is indicated by both +N or −N being in the low state, whereas an open condition is indicated by both HP and LP being in the high state.

Since, as above described, the outputs of comparators VC1 through VC4 are inverted by inverters I11 through I14, respectively, to provide the four signals which are the logical inverse of the comparator outputs, it may be seen that all signals required in accordance with the previous table are provided, and it may also be seen that the inputs to NAND gates NA1 through NA5 are coupled to these signals in accordance with the table. The NAND gates NA1 through NA5 in conjunction with their respective inverting gates NA6 through NA10 provide the logical equivalent of an AND gate, as previously mentioned. Accordingly, the signals appearing on lines 400, 402, 404, 406 and 408 are the positive logic signals representing a short circuit, normal pressure, high pressure, low pressure and an open circuit respectively. With switch 210 in the position shown, gates will be enabled to cause lamp 204 to indicate normal pressure, lamp 202 to indicate high pressure and lamp 206 to indicate low pressure. By depression of switch 210, lamp 202 will indicate a short circuit whereas lamp 206 will indicate an open circuit. Obviously, the specific lamps utilized to indicate short circuits and open circuits may be different from that shown in FIG. 20, and in fact there may readily be additional warning lamps for other warning devices operative without the use of switches such as switch 210.

The idea of the downhole information is to automtically control the pump of the oil well. The pump should be turned on when the fluid level (downhole pressure) rises to the predetermined maximum and turned off when the fluid level is pumped off to the predetermined minimum. Accordingly, the latch shown in FIG. 21 formed by NAND gates 800 and 802 are controlled by the high pressure (HP) and low pressure (LP) signals. When HP goes low (high pressure condition) the latch will be set which in turn energizes the optical isolator 804 to supply gate current to triac 806. The triac energizes relay 808 which controls the pump motor or pump contactor. Switch 810 is used to provide means of either automatically manually controlling the pump. When the $\overline{LP}$ signal goes low (low pressure condition) the latch resets which de-energizes the optical isolator, triac, relay, and pump. An open or short condition in the cable can also be used to reset the latch and thus stop the pump, if desired.

Figure 22:
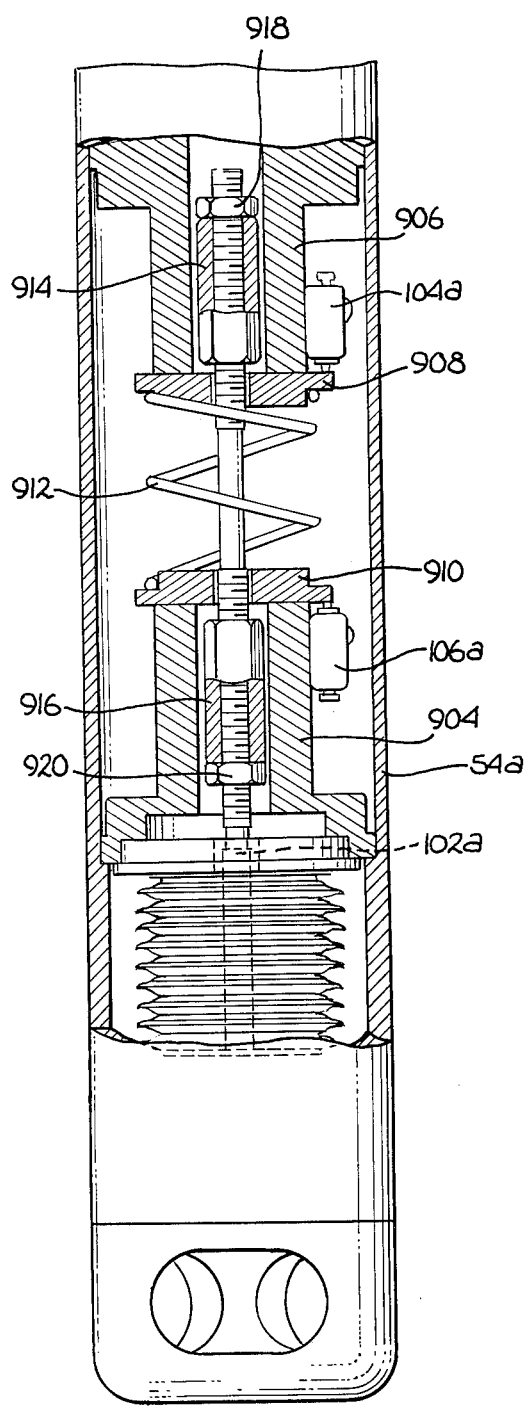
FIG. 22 is a partial cross section of a section of an alternate embodiment of the pressure sensor.
Figure 23:
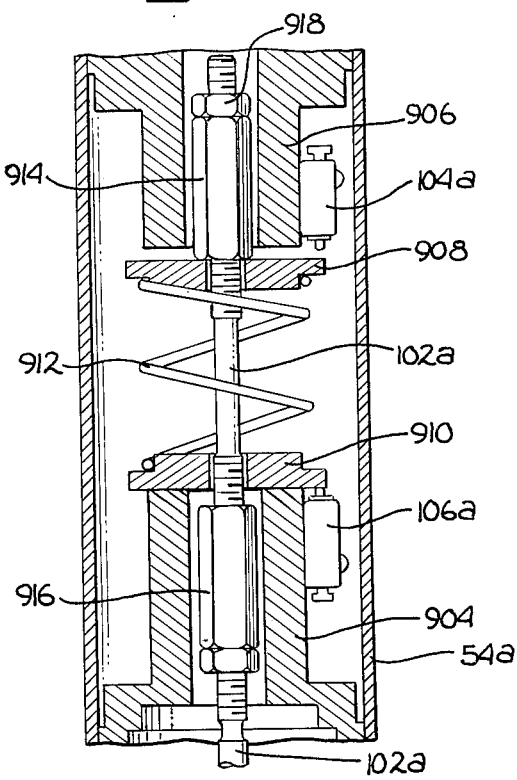
FIG. 23 is a partial cross section similalr to FIG. 22 illustrating the embodiment of FIG. 22 when subjected to a low pressure condition.
Figure 24:
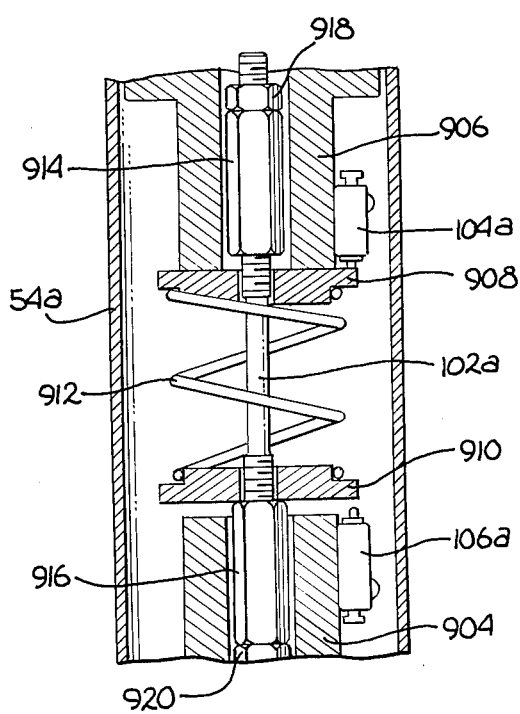
FIG. 24 is a partial cross section of the embodiment of FIG. 22 when subjected to a high pressure condition.

Now referring to FIG. 22, a partial cross section of an alternate embodiment of the sensor, as shown in FIG. 7, may be seen. This embodiment is functionally equivalent to the previous embodiment, though it features the same functional results utilizing commercially available high temperature micro switches 104A and 106A. In this embodiment the post 102A passes through a first cylindrical member 904 and a second cylindrical member 906, both supported by member 54A, and also passes through a pair of switch actuating members 908 and 910 urged into separation by compression spring 912. Adjustable nut like members 914 and 916 engage the shaft 102A. These nut like members are adjustable in vertical disposition and may be locked in the desired position by jam nuts 918 and 920. When the coil pressure is in the normal range, the relative disposition of the parts is as shown in FIG. 22, with switch actuating members 908 and 910 engagin micro switches 104A and 106A respectively with sufficient force of coil spring 912 to maintain both switches in the actuated position. When the pressure decreases, the shaft member 102A will move to a lower position, thereby opening switch 104A by the engagement of the nut like member 914 with switch actuating member 908 and the encouragement thereof away from switch 104A. Of course at this same time switch 106A remains actuated by the continued engagement of switch actuating member 910 with the switch, allowed by the compression of coil spring 912. The high pressure situation is illustrated in FIG. 24, where switch 106A is allowed to open by the lifting of switch actuating member 910 off switch 106A, with switch 104A remaining in the actuated position. Accordingly, the switching logic is identical to the logic hereinbefore explained with respect to FIG. 7, and this embodiment is operative with the circuits hereinbefore described. The advantage of this embodiment, however, is that commercially available microswitches may be used which have proven reliability, life and temperature characteristics, thereby avoiding substantial development and testing to prove an equivalent capability in newly designed equivalent components.

We claim:
1. A pressure sensor comprising;
   a case means defining a first enclosure,
   a differential pressure responsive means forming a part of the wall of said case,
   means for responding to the differential pressure across said differential pressure responsive means,
   first and second switch means coupled to said differential pressure responsive means and operative to provide first and second switching signals at first and second differential pressures,
   first and second diodes each coupled in series with said first and second switch means respectively, said first diode and said first switch means being coupled in parallel with said second diode and said second switch means to form a network forming first and second circuit means respectively, said network being coupled to first and second electrical connections, said network having predeterminedly different electrical characteristics when measured between said first and second electrical connections with the respective switch means closed; and
   means for coupling said first electrical connection to a cable conductor.
2. The pressure sensor of claim 1 wherein said first and second diodes being coupled in parallel with reverse polarities.
3. The pressure sensor of claim 1 further comprised of a third circuit means coupled in series with said network between said first and second electrical connections.

4. The pressure sensor of claim 3 wherein said third circuit means is a resistor.

5. The pressure sensor of claim 1 wherein said second electrical connection comprises the case of said pressure sensor, said pressure sensor case having a means for electrically and mechanically coupling to a shield of a cable containing said cable conductor.

6. A pressure sensor comprising;
a first enclosure,
a nestable bellows means defining a part of the wall of said first enclosure and responsive to the difference in pressure external to and internal to said first enclosure, said nested bellows means nesting to resist said difference in pressure above a predetermined value within said first enclosure,
first and second switch means within said first enclosure and coupled to said bellows and operative to provide first and second switching signals at first and second differential pressures respectively,
first and second diodes each coupled in series with said first and second switch means respectively, said first diode and said first switch means being coupled in parallel with said second diode and said second switch means to form a network forming first and second circuit means respectively, said network being coupled to first and second electrical connections, said network having predeterminedly different electrical characteristics when measured between said first and second electrical connections with the respective switch means closed; and,
means for coupling said first electrical connection to a cable conductor.

7. The pressure sensor of claim 6 further comprised of a second enclosure adjacent said first enclosure with said nested bellows forming a common wall therebetween, said first enclosure being substantially evacuated, said second enclosure being filled with a liquid and being defined in part by a flexible member for communicating the pressure external to send first and second enclosures to said liquid.

8. The pressure sensor of claim 7 further comprised of a protective member extending over said flexible member, said protective member having opening of a predetermined size to allow fluid communication therethrough but to protect said flexible member from solid objects of a substantial size.

9. The pressure sensor of claim 6 wherein said first and second switch means comprise first and second single pole switch means within said first enclosure with a moving member responsive to the motion of said nested bellows, said second electrical connection comprising the case of said pressure sensor, said second diode being coupled in series with said second switch means with the opposite polarity than said first diode coupled in series with said first switch means.

10. The pressure sensor of claim 9 further comprised of at least one resistor coupled in circuit to provide a predetermined resistance between said first and second electrical connections when at least one of said switch means is closed and the respective one of said diodes is forward biased.

11. A system for sensing pressures comprising:
a cable comprised of a single insulated conductor and a conductor shield,
a pressure sensor having a means responsive to fluid pressure surrounding said pressure sensor, and first and second switch means responsive to motion of said means responsive to fluid pressure to provide first and second switching signals, said first and second switch means each being coupled in series with first and second diodes respectively, between said conductor and said conductor shield, said first and second diodes forming first and second circuit means respectively having a predeterminedly different electrical characteristic when measured between said conductor and said conductor shield with the respective said switch means closed, and
an electronic circuit having a third circuit means coupled in series with said conductor and a means for applying an AC signal between said third circuit means and said cable shield, said electronic circuit having means coupled to said conductor for detecting the state of said first and second switch means by detecting voltages characteristic of the series combination of said first and third circuit means, and said third circuit means in series with the parallel combination of said first and second circuit means.

12. The system of claim 11 further comprised of a fourth circuit means in said pressure sensor and in series with said conductor, and a means in said electronic circuit for detecting voltages on said conductor which are less than those voltages produced by the series combination of said third and fourth circuit means and one of said first and second circuit means.

13. The system of claim 12 wherein said third and fourth circuit means are resistors.

* * * * *